United States Patent [19]

Karraker

[11] Patent Number: 5,135,728
[45] Date of Patent: Aug. 4, 1992

[54] METHOD FOR DISSOLVING DELTA-PHASE PLUTONIUM

[76] Inventor: David G. Karraker, 1600 Sherwood Pl., SE., Aiken, S.C. 29801

[21] Appl. No.: 817,007

[22] Filed: Jan. 3, 1992

[51] Int. Cl.⁵ .............................................. B01F 1/00
[52] U.S. Cl. .................................... 423/20; 252/626; 423/251; 423/3
[58] Field of Search .......................... 423/3, 20, 251; 252/626

[56] References Cited

U.S. PATENT DOCUMENTS

| | | | |
|---|---|---|---|
| 3,794,470 | 2/1974 | Meyer et al. | 422/159 |
| 3,981,961 | 9/1976 | Bathellier | 423/9 |
| 3,987,145 | 10/1976 | Bruns et al. | 423/10 |
| 4,011,296 | 3/1977 | Ruiz et al. | 423/4 |
| 4,021,313 | 5/1977 | Hausberger et al. | 204/1.5 |
| 4,162,230 | 7/1979 | Horwitz et al. | 252/301.1 |
| 4,229,421 | 10/1980 | Chapman et al. | 423/10 |
| 4,434,137 | 2/1984 | Stoll et al. | 423/6 |
| 4,528,130 | 7/1985 | Ledebrink et al. | 252/643 |
| 4,574,072 | 3/1986 | Horwitz et al. | 423/9 |
| 4,764,352 | 8/1988 | Bathellier et al. | 423/10 |
| 4,835,107 | 5/1989 | Horwitz et al. | 436/82 |
| 4,839,103 | 6/1989 | Steinhauser et al. | 252/643 |
| 4,983,300 | 1/1991 | Germain et al. | 210/634 |

OTHER PUBLICATIONS

Cleveland, J. M. The Chemistry of Plutonium, 1970, pp. 570-575.

Primary Examiner—Brooks H. Hunt
Assistant Examiner—Ngoclan T. Mai
Attorney, Agent, or Firm—Harold M. Dixon; William R. Moser; Richard E. Constant

[57] ABSTRACT

A process for dissolving plutonium, and in particular, delta-phase plutonium. The process includes heating a mixture of nitric acid, hydroxylammonium nitrate (HAN) and potassium fluoride to a temperature between 40° and 70° C., then immersing the metal in the mixture. Preferably, the nitric acid has a concentration of not more than 2M, the HAN approximately 0.66M, and the potassium fluoride 0.1M. Additionally, a small amount of sulfamic acid, such as 0.1M can be added to assure stability of the HAN in the presence of nitric acid. The oxide layer that forms on plutonium metal may be removed with a non-oxidizing acid as a pretreatment step.

18 Claims, No Drawings

METHOD FOR DISSOLVING DELTA-PHASE PLUTONIUM

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to recovery of delta-phase plutonium metal.

2. Discussion of Background

Plutonium metal is produced in six different crystalline phases. Some of these phases, such as the so-called alpha phase are stable; others, such as the delta phase are not stable without alloying with another metal such as aluminum or gallium. Delta phase plutonium is less dense than the more common alpha phase and it is two or three times more reactive, but delta phase plutonium is more machinable. Delta plutonium, because it is more machinable, finds use in a number of important defense-related applications. However, after a period of time during which radioactive decay introduces gamma-emitting impurities, the delta phase plutonium must be recovered and reprocessed before reuse.

Typically delta-phase plutonium purification begins by dissolving the plutonium metal in sulfamic acid. Dissolution is followed by separation of impurities, concentration, precipitation, filtering and drying to produce alpha-phase plutonium metal. However, the dissolution step generates a stoichiometric yield of hydrogen that must be handled carefully lest its concentration approach the explosive limit. This first step can also produce substantial quantities of plutonium hydride which, being pyrophoric, can spontaneously ignite during servicing of the dissolution vessel. Finally, a substantial amount of sulfate is generated by the oxidation or hydrolysis of the sulfamic acid. Sulfate is believed to be a principal cause of corrosion of waste evaporators.

Other processes related generally to plutonium recovery are known. Horwitz, et al., in U.S. Pat. No. 4,162,230, describe a process for recovery of actinide elements from nuclear reactor wastes, including plutonium. Their process includes adding hydrazine and hydroxylammonium nitrate (about 0.3 M each) to the waste to adjust the valence of the plutonium to 30 4. The hydrazine reduces any excess $HNO_2$ present in the solution which would destroy the HAN.

Hausberger, et al. describe another method for purifying plutonium in U.S. Pat. No. 4,021,313. Plutonium III in a solution of hydrazine nitrate and HAN is subjected to an electrolysis charge to oxidize anodically he plutonium III to plutonium IV.

Germain, et al., in U.S. Pat. No. 4,983,300, describe a process for the reextraction of plutonium present in an organic solvent by reducing plutonium IV to plutonium III. The reduction is achieved by contacting the solvent with an acidic mixture of a uranous salt and hydroxylamine salt.

Other references describe processes for concentration and separation of actinides (Horwitz, et al., in U.S. Pat. No. 4,835,107), for extraction of plutonium (Bathellier, et al., in U.S. Pat. No. 4,7674,352; Horwitz et al., in U.S. Pat. No. 4,574,072), for stripping plutonium from organic solvents (Bathellier, et al. U.S. Pat. No. 3,981,961), and for partitioning uranium and plutonium. Chapman, et al. (U.S. Pat. No. 4,229,421) describe a method for purifying plutonium contained in an aqueous solution along with uranium and neptunium.

SUMMARY OF THE INVENTION

According to its major aspects and broadly stated, the present process is a method for recovering plutonium from delta-phase plutonium by dissolution in a mixture of nitric acid, hydroxylammonium nitrate (HAN) and potassium fluoride. Preferably, the delta-phase plutonium is best dissolved in 2M $HNO_3$-0.6M HAN-0.1M KF at 40°-70° C. The resulting $Pu^{3+}$ solution has only 13% of the gas evolution and 40% of the waste production of the sulfamic acid dissolution process. Moreover, the dissolving residues are not pyrophoric and dissolution takes place faster. This dissolving method may also be applied to the dissolution of alpha-phase metal.

DETAILED DESCRIPTION OF A PREFERRED EMBODIMENT

It has been found that delta phase plutonium metal is dissolved effectively by a solution of 2M $HNO_3$-0.6M HAN-0.1M KF at 40°-70° C. This process produces $Pu^{+3}$ in solution.

The principle reactions are between Pu metal, as a reducing agent, and HAN and $HNO_3$, as oxidizing agents. The reactions are:

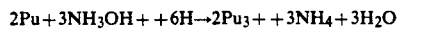

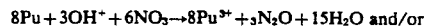

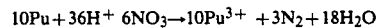

The reaction consumes 0.92 moles of HAN and 3.35 moles of $HNO_3$ per mole of plutonium dissolved. The average gas yield, under conditions where HAN is in excess, averages 16.7 ml (corrected to STP) per gram of plutonium. From the consumption of HAN and acid, it is calculated that the oxidation of HAN accounts for an average of 63% of the total reaction and oxidation by $HNO_3$, most of the remainder.

Fluoride concentration has a strong effect on both the dissolving rate and amount and composition of the residue. The dissolving rate at 50° C. increases about 60% as the fluoride concentration doubles. At 0.05M KF, the residue is 8.5% by weight of the plutonium dissolved with the residue being primarily hydrated $PuO_2$. At a concentration of 0.075M, the residue, 3.6% by weight, is a mixture of $PuO_2$ and $PuF_3$. At 0.01M KF, the residue is 6.5% by weight and is $PuF_3$.

Experiments in varying the HAN concentration from 0.33 to 1.0 M reveal only a small effect on the amount of gas evolved and no effect on the dissolving rate. The increase in gas evolution detected at lower HAN concentrations indicates that there is an increase in the reaction between $HNO_3$ and Pu metal, producing $H_2$. However, over the complete range of HAN concentrations, the ratio of the primary reaction of Pu dissolving showed little change with changes in HAN concentration.

Stability of HAN in solution, a reducing system in the presence of $HNO_3$, an oxidizing agent, is a concern generally, but not one if the $HNO_3$ concentration is less than 2M. This stability is attributed to scavenging of $HNO_2$ by HAN, thereby denying the kinetic path for $HNO_3$ oxidation. The addition of a small quantity of HSA, such as 0.1M is, however, suggested to assure stability of HAN.

The dissolution is especially suitable in a reaction vessel made of Inconel 690 because it is more resistant to corrosion than one made of stainless steel.

By comparison with the sulfamic acid process, the process of the present invention produces 13% of the gas volume, 40% of the solid waste and could reach higher dissolving rates. The residues of the present process are not pyrophoric and can be dissolved easily with minor changes in the process. The product of the present process is a nitrate solution that is compatible with the anion exchange and solvent extraction process without the need to further dilute the solution, as is required with the sulfamic process. This dissolving method may also be applied to the dissolution of alpha-phase metal.

It will be apparent to those skilled in the art that many changes and substitutions can be made to the preferred embodiment herein described without departing from the spirit and scope of the present invention as defined by the appended claims.

What is claimed is:

1. A process for dissolving plutonium metal, said process comprising the steps of:
   heating a mixture of nitric acid, hydroxylammonium nitrate and fluoride; and
   immersing said plutonium in said mixture.

2. The process as recited in claim 1, wherein said mixture is heated to a temperature of at least approximately 40° C.

3. The process as recited in claim 1, wherein said mixture is heated to a temperature between approximately 40° C. and 70° C.

4. The process as recited in claim 1, wherein said nitric acid has a concentration of not more than 2M.

5. The process as recited in claim 1, wherein the concentration of said hydroxylammonium nitrate is at least approximately 0.33M.

6. The process as recited in claim 1, wherein the concentration of said hydroxylammonium nitrate is between approximately 0.33M and 1.0M.

7. The process as recited in claim 1, wherein said fluoride further comprises potassium fluoride.

8. The process as recited in claim 1, wherein said fluoride further comprises potassium fluoride having a concentration of at least 0.05M.

9. The process as recited in claim 1, wherein said fluoride further comprises potassium fluoride having a concentration of between 0.05M and 0.1M.

10. The process as recited in claim 1, wherein said mixture further comprises less than approximately 0.1M sulfamic acid.

11. A process for dissolving plutonium metal, said process comprising the steps of:
    heating a mixture of nitric acid, hydroxylammonium nitrate and potassium fluoride; and
    immersing said plutonium in said mixture;
    said nitric acid having a concentration of not more than 2M,
    said hydroxylammonium nitrate having a concentration of between approximately 0.33 M and 1 M, and
    said potassium fluoride having a concentration between approximately 0.05 M approximately 0.1 M.

12. The process as recited in claim 11, wherein said mixture is heated to a temperature between approximately 40° and 70° C.

13. The process as recited in claim 11, wherein said concentration of hydroxylammonium nitrate is approximately 0.66 M.

14. The process as recited in claim 11, wherein said concentration of potassium fluoride is approximately 0.1 M.

15. The process as recited in claim 11, wherein said concentration of nitric acid is approximately 2 M.

16. The process as recited in claim 11, wherein said mixture is heated to a temperature between approximately 40° and 70° C. and wherein said concentration of potassium fluoride is approximately 0.1 M.

17. The process as recited in claim 11, wherein said mixture further comprises less than approximately 0.1 M sulfamic acid.

18. The process as recited in claim 11, wherein said mixture is heated to a temperature between approximately 40° and 70° C., said concentration of potassium fluoride is approximately 0.1 M and said said mixture further comprises less than approximately 0.1 M sulfamic acid.

* * * * *